(12) United States Patent
Cho et al.

(10) Patent No.: US 10,934,394 B2
(45) Date of Patent: Mar. 2, 2021

(54) COMPOSITION COMPRISING POLYMER AND INORGANIC PARTICLES, POLYIMIDE-INORGANIC PARTICLES COMPOSITE, ARTICLE INCLUDING THE COMPOSITE, AND OPTICAL DEVICE INCLUDING THE ARTICLE

(71) Applicant: Samsung Electronics Co., Ltd., Suwon-si (KR)

(72) Inventors: Won Joon Cho, Suwon-si (KR); Young Jae Kang, Suwon-si (KR); Hyunseok Choi, Seoul (KR)

(73) Assignees: SAMSUNG ELECTRONICS CO., LTD., Gyeonggi-do (KR); SAMSUNG DISPLAY CO., LTD., Gyeonggi-do (KR)

( * ) Notice: Subject to any disclaimer, the term of this patent is extended or adjusted under 35 U.S.C. 154(b) by 25 days.

(21) Appl. No.: 16/375,417

(22) Filed: Apr. 4, 2019

(65) Prior Publication Data

US 2019/0309131 A1    Oct. 10, 2019

(30) Foreign Application Priority Data

Apr. 4, 2018  (KR) .................. 10-2018-0039402

(51) Int. Cl.
*C09C 3/12*  (2006.01)
*C08G 73/10*  (2006.01)
*C08K 9/06*  (2006.01)
*C08K 3/22*  (2006.01)
*G02B 1/04*  (2006.01)
*C09C 1/36*  (2006.01)

(52) U.S. Cl.
CPC ..... *C08G 73/1067* (2013.01); *C08G 73/1007* (2013.01); *C08K 3/22* (2013.01);
(Continued)

(58) Field of Classification Search
None
See application file for complete search history.

(56) References Cited

U.S. PATENT DOCUMENTS

| 8,202,573 B2 | 6/2012 | Pokorny et al. |
| 9,193,850 B2 | 11/2015 | Miyao et al. |

(Continued)

FOREIGN PATENT DOCUMENTS

| JP | 2006213805 A | 8/2006 |
| JP | 2008257925 A | 10/2008 |

(Continued)

*Primary Examiner* — Robert S Loewe
(74) *Attorney, Agent, or Firm* — Cantor Colburn LLP

(57) ABSTRACT

A composition including a polymer including at least one of an amic acid structural unit and an imide structural unit and an inorganic particle surface-treated with a compound represented by Chemical Formula 1, a polymer-inorganic particle nanocomposite prepared using the composition an article and an optical device including the article:

Chemical Formula 1

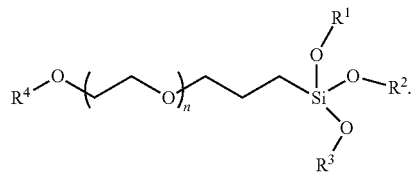

In Chemical Formula 1, $R^1$ to $R^4$ are independently a C1 to C30 alkyl group, a C3 to C10 cycloalkyl group, a C6 to C30 aryl group, or a combination thereof, and n is an integer of 1 or more.

19 Claims, 8 Drawing Sheets

(52) U.S. Cl.
CPC .............. *C08K 9/06* (2013.01); *C09C 1/3684*
(2013.01); *G02B 1/04* (2013.01); *C01P*
*2004/16* (2013.01); *C08K 2003/2241*
(2013.01); *C08K 2201/005* (2013.01); *C08K*
*2201/011* (2013.01)

(56) References Cited

U.S. PATENT DOCUMENTS

| | | | |
|---|---|---|---|
| 9,334,370 | B2 | 5/2016 | Cho et al. |
| 2010/0189970 | A1 | 7/2010 | Pokorny et al. |
| 2012/0088845 | A1* | 4/2012 | Gonen Williams ............... H01L 21/02628 514/772.4 |
| 2013/0207053 | A1* | 8/2013 | Gonen Williams ..... C30B 29/16 252/519.3 |
| 2014/0034651 | A1* | 2/2014 | Durand .................. C09D 7/41 220/573.2 |
| 2018/0258258 | A1 | 9/2018 | Lee et al. |
| 2018/0355175 | A1 | 12/2018 | Han et al. |
| 2018/0371196 | A1 | 12/2018 | Park et al. |

FOREIGN PATENT DOCUMENTS

| | | |
|---|---|---|
| JP | 201340239 A | 2/2013 |
| JP | 201587710 A | 5/2015 |
| KR | 1020130031052 A | 3/2013 |
| KR | 1020150065975 A | 6/2015 |
| KR | 1020160089748 A | 7/2016 |
| KR | 1020170059550 A | 5/2017 |
| KR | 1020170068823 A | 6/2017 |
| KR | 1020180103341 A | 9/2018 |

\* cited by examiner

COMPOSITION COMPRISING POLYMER AND INORGANIC PARTICLES, POLYIMIDE-INORGANIC PARTICLES COMPOSITE, ARTICLE INCLUDING THE COMPOSITE, AND OPTICAL DEVICE INCLUDING THE ARTICLE

CROSS-REFERENCE TO RELATED APPLICATION

This application claims priority to and the benefit of Korean Patent Application No. 10-2018-0039402 filed in the Korean Intellectual Property Office on Apr. 4, 2018, the entire contents of which are incorporated herein by reference.

BACKGROUND

1. Field

This disclosure relates to a composition including a polymer including an amic acid structural unit and/or an imide structural unit, and an inorganic particle, a polyimide-inorganic particle composite manufactured from the composition, an article including the composite, and an optical device including the article.

2. Description of the Related Art

A colorless transparent material has been researched for diverse purposes such as for an optical lens, a functional optical film, and a disk substrate, but as information devices are being further miniaturized and display devices are providing higher resolution, more functions and greater performance are required from the material. Therefore, it would be a particular advantage to develop a colorless transparent material having excellent transparency, heat resistance, mechanical strength, and flexibility.

SUMMARY

An embodiment provides a composition including a polymer and an inorganic particle capable of being mixed with the polymer uniformly.

Another embodiment provides a polyimide-inorganic particle composite manufactured from the composition and having improved mechanical characteristics and optical properties.

Yet another embodiment provides an article having improved optical properties and mechanical characteristics and including the polyimide-inorganic particle composite.

Still another embodiment provides an optical device including the article.

An embodiment provides a composition including a polymer including an amic acid structural unit, an imide structural unit, or a combination thereof, and an inorganic particle, wherein a surface of the inorganic particle is treated with a compound represented by Chemical Formula 1:

Chemical Formula 1

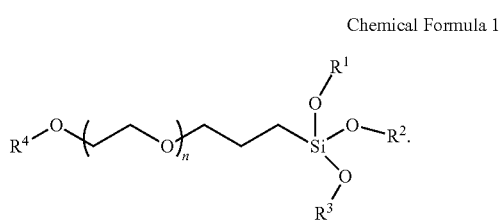

In Chemical Formula 1, $R^1$ to $R^4$ are independently a C1 to C30 alkyl group, a C3 to C10 cycloalkyl group, a C6 to C30 aryl group, or a combination thereof, and n is an integer of 1 or more.

$R^1$ to $R^4$ of Chemical Formula 1 may independently be a C1 to C10 alkyl group, and n may be an integer greater than or equal to 3 and less than or equal to 30.

Each $R^1$ to $R^4$ of Chemical Formula 1 may be a methyl group, and n may be an integer greater than or equal to 5 and less than or equal to 20.

The inorganic particle may be an oxide, a hydroxide, a carboxylate, or a nitride of Ti, Si, Al, Zr, Zn, Sn, B, Ce, Sr, Ca, Ba, In, or W, a graphene oxide, or a combination thereof.

The inorganic particle may be silica ($SiO_2$), alumina ($Al_2O_3$), titania ($TiO_2$), zirconia ($ZrO_2$), zinc oxide (ZnO), indium tin oxide (ITO), strontium carbonate ($SrCO_3$), zirconium tungsten oxide ($ZrW_2O_8$), antimony-doped tin oxide, or graphene oxide.

The inorganic particle may have an aspect ratio of about 1 to about 100.

The inorganic particle may have an average particle diameter of a shortest particle diameter ranging from about 0.1 nanometers (nm) to about 200 nm.

The inorganic particle may be a titania ($TiO_2$) nanorod.

An aspect ratio of the titania nanorod may range from about 1.5 to about 50 and an average particle diameter of a shortest particle diameter may range from about 0.1 nm to about 10 nm.

The inorganic particle may be included in an amount of less than or equal to about 50 parts relative to 100 parts by weight of the polymer.

The composition may further include a solvent.

The amic acid structural unit may be represented by Chemical Formula 2, and the imide structural unit may be represented by Chemical Formula 3:

Chemical Formula 2

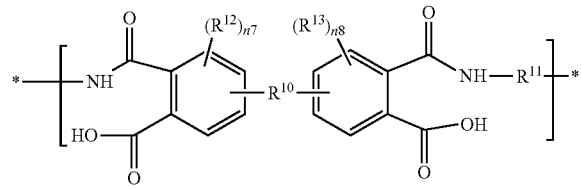

Chemical Formula 3

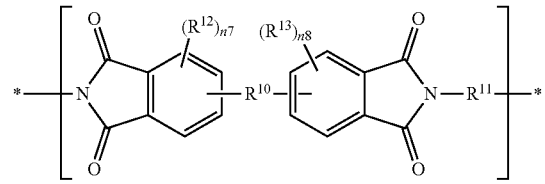

In Chemical Formula 2 and Chemical Formula 3, $R^{10}$ is a single bond, a substituted or unsubstituted C1 to C30 aliphatic organic group, a substituted or unsubstituted C3 to C30 alicyclic organic group, a substituted or unsubstituted C6 to C30 aromatic organic group, a substituted or unsubstituted C2 to C30 hetero cyclic group, or a combination thereof, $R^{11}$ is a substituted or unsubstituted C4 to C20 aliphatic cyclic group, or a substituted or unsubstituted C6 to C30 aromatic organic group, wherein the substituted or unsubstituted aromatic organic group is a single ring; a fused ring including two or more fused rings; or as a ring system including two or more substituted or unsubstituted single or fused aromatic rings linked by a single bond, a fluorenylene group, a substituted or unsubstituted C3 to C10 cycloalkylene group, a substituted or unsubstituted C6 to C15 arylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, —C(=O)NH—, or a combination thereof, $R^{12}$ and $R^{13}$ are independently a halogen, a hydroxy group, a substituted or unsubstituted C1 to C10 aliphatic organic group, a substituted or unsubstituted C6 to C20 aromatic organic group, a —OR$^{201}$ group (wherein, R$^{201}$ is a C1 to C10 aliphatic organic group), or —SiR$^{210}$R$^{211}$R$^{212}$ (wherein R$^{210}$, R$^{211}$ and R$^{212}$ are independently hydrogen or a C1 to C10 aliphatic organic group) group, and n7 and n8 are independently an integer from 0 to 3.

In Chemical Formula 2 and Chemical Formula 3, $R^{10}$ is a single bond, or a substituted or unsubstituted C1 to C30 aliphatic organic group, $R^{11}$ includes a substituted or unsubstituted C6 to C30 aromatic organic group, wherein the substituted or unsubstituted C6 to C30 aromatic organic group includes two or more single or fused aromatic rings that are linked by a single bond, a fluorenylene group, a substituted or unsubstituted C3 to C10 cycloalkylene group, a substituted or unsubstituted C6 to C15 arylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, —C(=O)NH—, or a combination thereof, $R^{12}$ and $R^{13}$ are independently a halogen, a hydroxy group, a substituted or unsubstituted C1 to C10 alkyl group, or a substituted or unsubstituted C6 to C20 aromatic organic group, and n7 and n8 are independently 0 or 1.

In Chemical Formula 2 or Chemical Formula 3, $R^{10}$ is a single bond, or a C1 to C10 alkylene group substituted with a haloalkyl group, $R^{11}$ is a substituted two phenylene groups linked by a single bond, a fluorenylene group, a substituted or unsubstituted phenylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, —C(=O)NH—, or a combination thereof, $R^{12}$ and $R^{13}$ are independently a halogen, a hydroxy group, a substituted or unsubstituted C1 to C5 alkyl group, or a substituted or unsubstituted phenyl group, and n7 and n8 are independently 0 or 1.

Chemical Formula 2 may be represented by Chemical Formula 2-1, Chemical Formula 2-2, or a combination thereof, and Chemical Formula 3 may be represented by Chemical Formula 3-1, Chemical Formula 3-2, or a combination thereof:

Chemical Formula 2-1

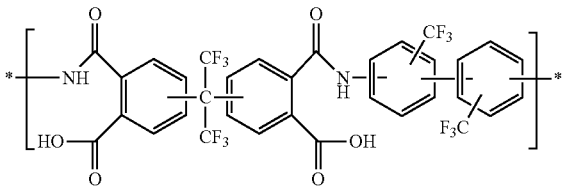

Chemical Formula 2-2

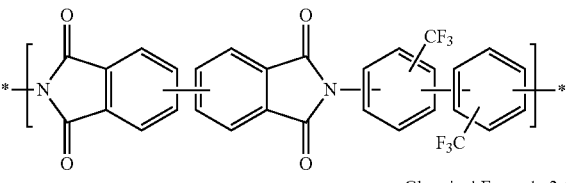

Chemical Formula 3-1

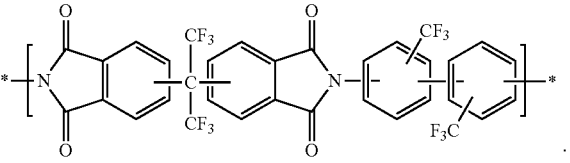

Chemical Formula 3-2

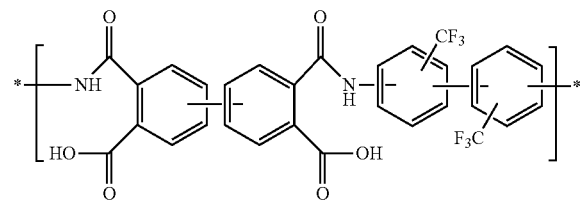

The polymer may further include an amide structural unit represented by Chemical Formula 4:

Chemical Formula 4

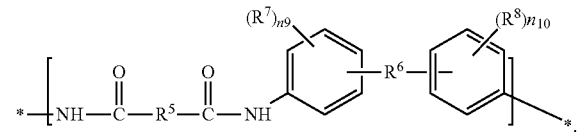

In Chemical Formula 4, $R^5$ is a substituted or unsubstituted C6 to C30 aromatic organic group, $R^6$ is a single bond, a fluorenylene group, a substituted or unsubstituted C3 to C10 cycloalkylene group, a substituted or unsubstituted C6 to C15 arylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, —C(=O)NH—, or a combination thereof, $R^7$ and $R^8$ are independently a halogen, a hydroxy group, a substituted or unsubstituted C1 to C10 aliphatic organic group, a C6 to C20 aromatic organic group, —OR$^{200}$ (wherein R$^{200}$ is a C1 to C10 aliphatic organic group), or a silyl group (—SiR$^{201}$R$^{202}$R$^{203}$, wherein R$^{201}$, R$^{202}$, and R$^{203}$ are independently hydrogen, a C1 to C10 aliphatic organic group), and n9 and n10 are independently an integer of 0 to 4.

Another embodiment provides a polyimide-inorganic particle composite manufactured from the composition according to an embodiment.

Yet another embodiment provides an article including the polyimide-inorganic particle composite according to the embodiment.

The article may be a film.

Still another embodiment provides an optical device including the article according to an embodiment.

The composition according to an embodiment includes an inorganic particle wherein the surface of the inorganic particle is treated with a silane coupling agent represented by a particular chemical formula, so that the inorganic particle may be uniformly distributed in the composition. Accordingly, an article manufactured by curing the composition including the polymer and the inorganic particle shows improved mechanical characteristics without deteriorating optical properties, and accordingly, when the composition is prepared into a film, excellent optical properties and mechanical properties may be obtained. The film according to an embodiment has excellent optical properties and mechanical properties and may be usefully applied to a window film for a display device or a film for various optical devices requiring high transparency, surface hardness, and the like.

DETAILED DESCRIPTION

Figure 1:
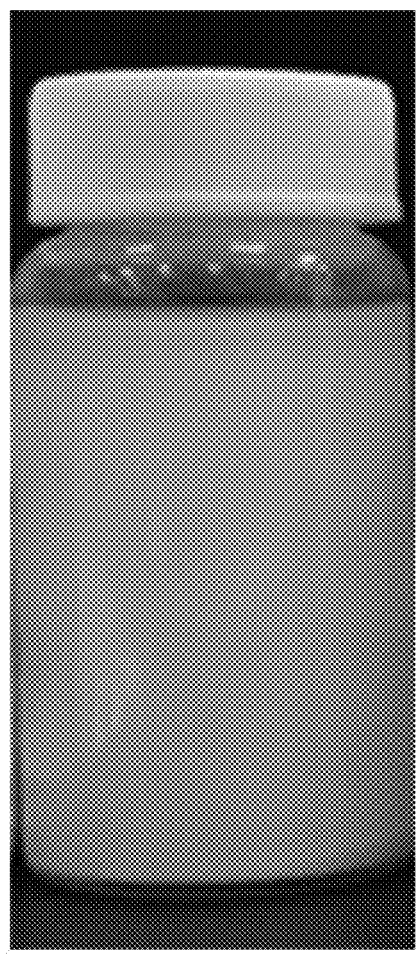
FIG. 1 is a photograph showing a dispersion including polyimide and titania, wherein the titania surfaces are not treated, in an MIBK (methyl isobutyl ketone) solvent.

Hereinafter, embodiments are described in detail. However, these embodiments are exemplary, the present disclosure is not limited thereto, and the present disclosure is defined by the scope of claims. Rather, these embodiments are provided so that this disclosure will be thorough and complete, and will fully convey the scope of the invention to those skilled in the art.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within +30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, when a definition is not otherwise provided, "substituted" refers to replacement of at least one hydrogen of a functional group of the present disclosure by a substituent selected from a halogen atom (—F, —Cl, —Br, or —I), a hydroxy group, a nitro group, a cyano group, an amino group ((NH$_2$, NH(R$^{100}$) or N(R$^{101}$)(R$^{102}$), wherein R$^{100}$, R$^{101}$, and R$^{102}$ are independently a C1 to C10 alkyl group), an amidino group, a hydrazine group, a hydrazone group, a carboxyl group, an ester group, a ketone group, a substituted or unsubstituted alkyl group, a substituted or unsubstituted alicyclic organic group, a substituted or unsubstituted aryl group, a substituted or unsubstituted alkenyl group, a substituted or unsubstituted alkynyl group, a substituted or unsubstituted heteroaryl group, and a substituted or unsubstituted heterocyclic group or the substituents may be linked with each other to form a ring.

As used herein, when specific definition is not otherwise provided, "aliphatic organic group" refers to a C1 to C30 alkyl group, a C2 to C30 alkenyl group, a C2 to C30 alkynyl group, a C1 to C30 alkylene group, a C2 to C30 alkenylene group, or a C2 to C30 alkynylene group, and specifically a C1 to C15 alkyl group, a C2 to C15 alkenyl group, a C2 to C15 alkynyl group, a C1 to C15 alkylene group, a C2 to C15 alkenylene group, or a C2 to C15 alkynylene group, "alicyclic organic group" refers to a C3 to C30 cycloalkyl group, a C3 to C30 cycloalkenyl group, a C3 to C30 cycloalkynyl group, a C3 to C30 cycloalkylene group, a C3 to C30 cycloalkenylene group, or C3 to C30 cycloalkynylene group, and specifically a C3 to C15 cycloalkyl group, a C3 to C15 cycloalkenyl group, a C3 to C15 cycloalkynyl group, a C3 to C15 cycloalkylene group, a C3 to C15 cycloalkenylene group, or C3 to C15 cycloalkynylene group, "aromatic organic group" refers to a C6 to C30 aryl group or a C6 to C30 arylene group, and specifically a C6 to C16 aryl group or a C6 to C16 arylene group, and "heterocyclic group" refers to a C2 to C30 heterocycloalkyl group, a C2 to C30 heterocycloalkylene group, a C2 to C30 heterocycloalkenyl group, a C2 to C30 heterocycloalkenylene group, a C2 to C30 heterocycloalkynyl group, a C2 to C30 heterocycloalkynylene group, a C2 to C30 heteroaryl group, or a C2 to C30 heteroarylene group that include 1 to 3 heteroatoms selected from O, S, N, P, Si, and a combination thereof in one ring, and specifically a C2 to C15 heterocycloalkyl group, a C2 to C15 heterocycloalkylene group, a C2 to C15 heterocycloalkenyl group, a C2 to C15 heterocycloalkenylene group, a C2 to C15 heterocycloalkynyl group, a C2 to C15 heterocycloalkynylene group, a C2 to C15 heteroaryl group, or a C2 to C15 heteroarylene group that include 1 to 3 heteroatoms selected from O, S, N, P, Si, and a combination thereof in one ring.

As used herein, when specific definition is not otherwise provided, the term "combination" refers to mixing or copolymerization. Herein, "copolymerization" refers to random copolymerization, block copolymerization, or graft copolymerization.

As used herein, "*" indicates a point where the same or different atom or chemical formula is linked.

There has been an increasing demand for display devices that consume a small amount of power, that are light and flexible, and that can be used anywhere and at any time. There is a need for a flexible display device having a flexible substrate that can be made from organic and inorganic materials using a low temperature process, having flexible electronics, and having improved sealing and packing technology.

Transparent plastic films applied as flexible display devices have replaced conventional window cover glass and requires high hardness and optical properties. The hardness may be complemented by coating a hard coating layer thereon, but herein, a base film having a high tensile modulus (hereinafter "modulus") may contribute to increasing the hardness of a final film. The optical properties may include high light transmittance, a low haze, a low yellowness index (YI), UV coloring resistance characteristics, and the like.

In order to improve the mechanical properties of the transparent plastic film, a nanocomposite was prepared by mixing inorganic material nanoparticles with a polymer, such as, a polyimide, a polyamide, and the like. However, the inorganic material nanoparticles may not be uniformly mixed with the polymer, may be agglomerated, or may form an aggregate. The nanoparticle aggregates have a negative influence on optical properties of a film and the like formed from the nanocomposite including the same. To prevent agglomeration of the nanoparticles, the nanoparticles may be added in a small amount, for example, in an amount of about 5 wt % based on an amount of the polymer. However, when the nanoparticles are added in a small amount, the resulting film and the like shows insufficient improvement in mechanical properties, and when the amount of the nanoparticles is increased, optical properties (transmittance, YI, haze, and the like) are sharply deteriorated.

In an attempt to solve this problem, U.S. Pat. No. 9,365,694 disclosed a composition including a polyimide or poly(imide-amide) copolymer wherein at least one terminal end of the copolymer was substituted with a siloxane or silanol group; and an inorganic oxide or inorganic hydroxide particle or a precursor thereof. The U.S. Patent discloses that the composition includes an inorganic oxide or an inorganic hydroxide particle in an amount greater than or equal to about 5 wt %, for example, in a range of about 5 wt % to about 95 wt % based on a total weight of a polymer. The siloxane or silanol group bound to a terminal end of the copolymer forms a chemical bond with the inorganic oxide or the inorganic hydroxide particle.

U.S. Patent Publication No. 2016-0096927 A1 disclosed a polyimide-inorganic particle nanocomposite, wherein the inorganic particles were bound or grafted to the polyimide through a chemical bond between the inorganic particles and the polyimide main chains. Such nanocomposites were prepared by in-situ polymerization of the monomers for forming the polyimide in the presence of the inorganic particles having an amino group on their surfaces. The polyimide-inorganic particle nanocomposite disclosed in this U.S. Patent Publication includes the inorganic particles in an amount of less than or equal to about 2 volume % based on a total volume of the prepared polyimide (solid content), or less than or equal to about 5 weight % based on a total weight of the prepared polyimide (solid content), and accordingly, the polymer-inorganic particle nanocomposite includes the inorganic particles in a small amount as described above.

The present inventors hereof have developed a composition for a polymer-inorganic particle nanocomposite including a larger amount of inorganic particles and having improved mechanical properties without deteriorating the optical properties. The inorganic particles are uniformly dispersed in a polymer matrix and form no aggregate, even when the inorganic particles are included in an amount of greater than or equal to about 5 wt %, for example, greater than or equal to about 10 wt %, greater than or equal to about 15 wt %, greater than or equal to about 20 wt %, greater than or equal to about 25 wt %, greater than or equal to about 30 wt %, greater than or equal to about 35 wt %, greater than or equal to about 40 wt %, greater than or equal to about 45 wt %, or greater than or equal to about 50 wt % based on a weight of a polymer, provided that the surface of the inorganic particles are treated with a silane compound having a polyethylene glycol group to prevent agglomeration of the inorganic particles in the composition and uniformly disperse them in the polymer. Herein, the polymer may be any polymer, but a polyimide or poly(imide-amide) copolymer is particularly suitable for an optical film having high heat resistance, excellent optical properties, and improved mechanical properties in an exemplary embodiment.

Accordingly, an embodiment provides a composition including a polymer including an amic acid structural unit, an imide structural unit, or a combination thereof, and an inorganic particle wherein a surface of the inorganic particle is treated with a compound represented by Chemical Formula 1:

Chemical Formula 1

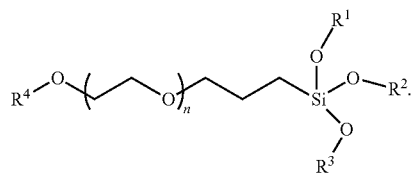

In Chemical Formula 1, $R^1$ to $R^4$ are independently a C1 to C30 alkyl group, a C3 to C10 cycloalkyl group, a C6 to C30 aryl group, or a combination thereof, and n is an integer of 1 or more.

$R^1$ to $R^4$ of Chemical Formula 1 may independently be a C1 to C10 alkyl group, for example, a C1 to C5 alkyl group, for example, each of $R^1$ to $R^4$ may be a methyl group, n of Chemical Formula 1 may be an integer greater than or equal to 3 and less than or equal to 30, for example, an integer greater than or equal to 5 and less than or equal to 20, for example, an integer greater than or equal to 8 and less than or equal to 15, or for example, an integer greater than or equal to 9 and less than or equal to 12.

In the technology area of mixing inorganic particles with a polymer to prepare a polymer-inorganic particle nanocomposite, a method of surface-treating inorganic particles with a silane coupling agent, such as, 3-aminopropyl-trimethoxysilane (APS), 3-aminopropyl-triethoxysilane, or 3-aminophenyl-trimethoxysilane, and the like, is known. As for a composition including the inorganic particles wherein a surface of the inorganic particle is treated with silane coupling agents, the inorganic particles are known to form aggregates and not be uniformly dispersed in the composition. However, the inorganic particles wherein a surface of the inorganic particle is treated with the compound represented by Chemical Formula 1, for example, a silane compound including at least one ethylene oxide group, are not agglomerated but instead are uniformly dispersed in the composition including the polymer.

Figure 2:
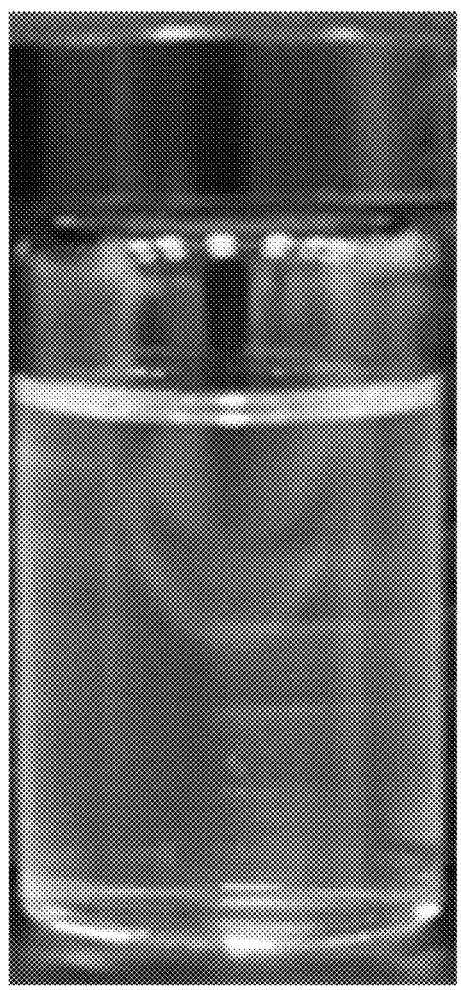
FIG. 2 is a TEM (transmission electron microscopy) photograph showing the dispersion shown in FIG. 1.
Figure 3:
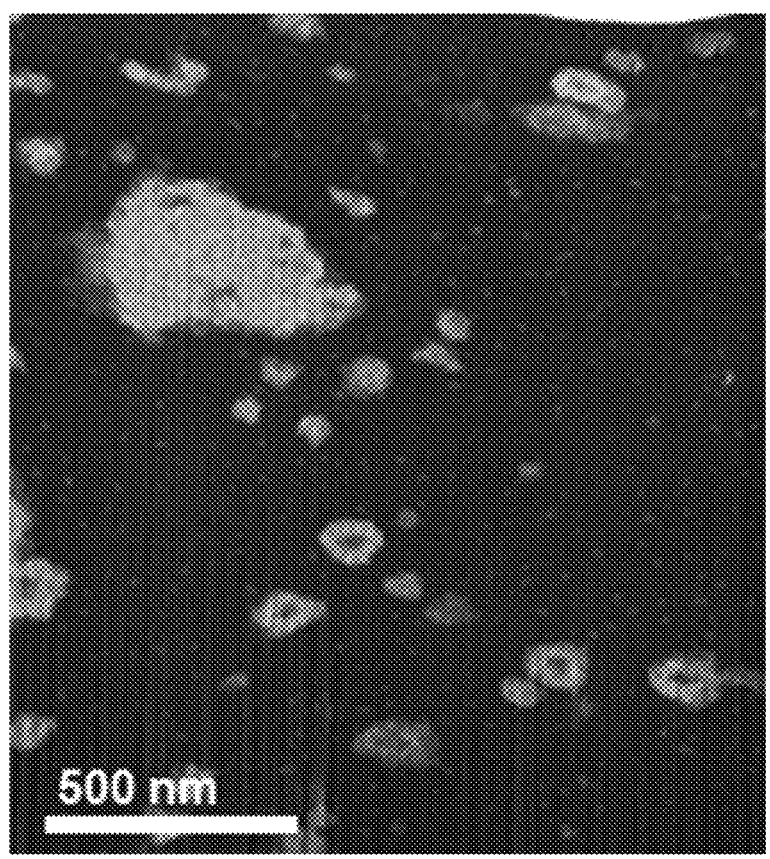
FIG. 3 is a photograph showing a dispersion including polyimide and titania, wherein the titania surfaces are treated with a compound represented by Chemical Formula 5, in an MIBK solvent.
Figure 4:
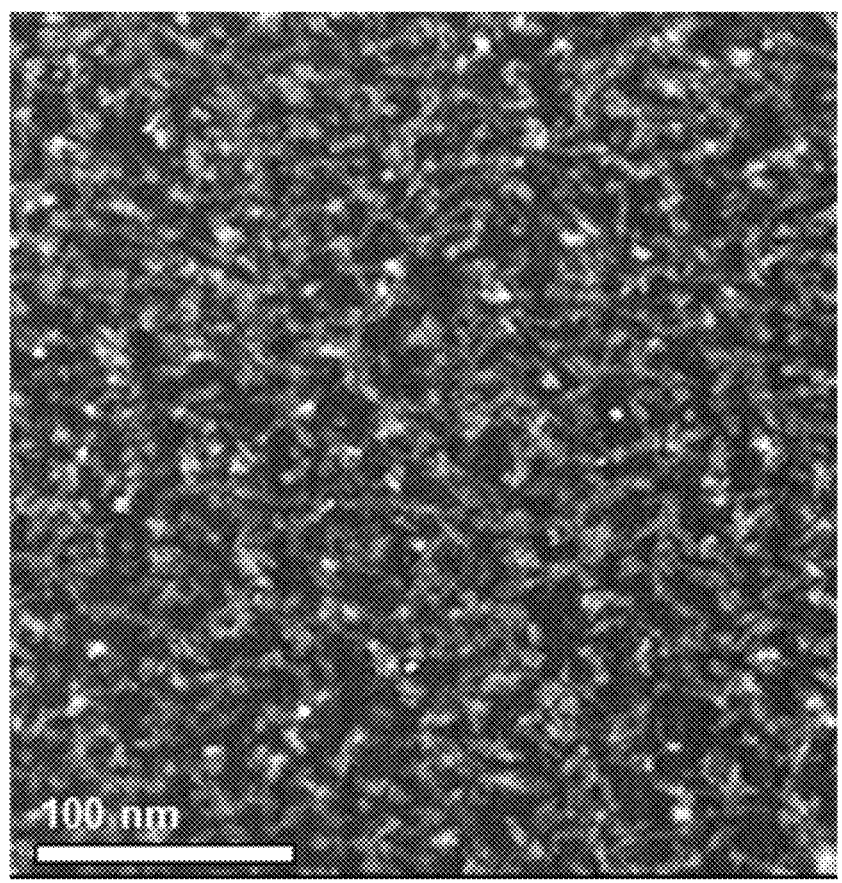
FIG. 4 is a TEM (transmission electron microscopy) photograph showing the dispersion shown in FIG. 3.

As shown in FIGS. 1 and 2, a solution including 15 parts by weight of $TiO_2$ particles, wherein the surfaces are not treated, based on 100 parts by weight of polyamic acid along with a polyimide present in a concentration of 18 wt % in MIBK (methyl isobutyl ketone) appears cloudy upon visual examination (FIG. 1). A solution prepared by adding $TiO_2$ particles, wherein the surface is treated with the silane compound represented by Chemical Formula 1, in an equal amount to a polyamic acid solution appears transparent upon visual examination (FIG. 2). In addition, FIGS. 3 and 4 show TEM (Transmission Electron Microscopy) photographs of films respectively formed from the solutions of FIGS. 1 and 2. FIG. 3 shows that the $TiO_2$ particles form an aggregate having a diameter of greater than or equal to about 50 nm, and at most about 500 nm, but FIG. 4 shows that the surface-treated $TiO_2$ particles are not agglomerated at all, but uniformly dispersed throughout the film.

In this way, the composition including the inorganic particles and a polymer, wherein a surface of the inorganic particles is treated with the compound represented by Chemical Formula 1, may have improved mechanical properties without deteriorating the optical properties of an article, such as, a film, and the like, formed therefrom, as the inorganic particles are not agglomerated but uniformly dispersed in the composition, as shown in the Examples that will be described later.

The inorganic particle may be any optically transparent material. For example, the inorganic particle may be an oxide, a hydroxide, a carboxylate, or a nitride of Ti, Si, Al, Zr, Zn, Sn, B, Ce, Sr, Ca, Ba, In, or W, a graphene oxide, or a combination thereof, but is not limited thereto. For example, the inorganic particle may be silica ($SiO_2$), alumina ($Al_2O_3$), titania ($TiO_2$), zirconia ($ZrO_2$), zinc oxide (ZnO), indium tin oxide (ITO), strontium carbonate ($SrCO_3$), zirconium tungsten oxide ($ZrW_2O_8$), antimony-doped tin oxide, graphene oxide, or a combination thereof, but is not limited thereto.

The inorganic particle may have a spherical shape or a nonspherical shape, such as, for example, a rod shape, or a fiber shape. Accordingly, the aspect ratio of the inorganic particle may range from about 1 to about 100, for example, about 1 to about 80, about 1 to about 50, about 1 to about 30, or about 1 to about 10, but is not limited thereto.

When the particle has an aspect ratio is 1 or greater, the average particle diameter of the shortest particle diameter may range from about 0.1 nm to about 200 nm, for example, about 0.1 nm to about 150 nm, about 0.1 nm to about 100 nm, about 1 nm to about 100 nm, about 1 nm to about 80 nm, about 1 nm to about 70 nm, about 1 nm to about 50 nm, about 1 nm to about 30 nm, about 1 nm to about 20 nm, about 1 nm to about 10 nm, or about 1 nm to about 5 nm, but is not limited thereto.

When the particle is a spherically shaped particle having an aspect ratio of 1, the average particle diameter may range from about 0.1 nm to about 200 nm, for example, about 0.1 nm to about 150 nm, about 0.1 nm to about 100 nm, about 1 nm to about 100 nm, about 1 nm to about 80 nm, about 1 nm to about 70 nm, about 1 nm to about 50 nm, about 1 nm to about 30 nm, about 1 nm to about 20 nm, about 1 nm to about 10 nm, or about 1 nm to about 5 nm, but is not limited thereto.

The inorganic particle may be included in an amount of less than or equal to about 50 parts by weight, for example, less than or equal to about 45 parts by weight, less than or equal to about 40 parts by weight, less than or equal to about 38 parts by weight, or less than or equal to about 35 parts by weight, or in an exemplary embodiment, about 3 parts by weight to about 50 parts by weight, for example, about 3 parts by weight to about 45 parts by weight, about 5 parts by weight to about 40 parts by weight, about 5 parts by weight to about 35 parts by weight, about 10 parts by weight to about 35 parts by weight, about 12 parts by weight to about 35 parts by weight, about 15 parts by weight to about 33 parts by weight, about 15 parts by weight to about 30 parts by weight, about 18 parts by weight to about 30 parts by weight, about 20 parts by weight to about 30 parts by weight, about 25 parts by weight to about 30 parts by weight, about 15 parts by weight to about 25 parts by weight, or about 18 parts by weight to about 25 parts by weight based on 100 parts by weight of the polymer, but is not limited thereto.

The inorganic particle may be included in an amount of about 15 parts by volume, less than or equal to about 13 parts by volume, less than or equal to about 10 parts by volume, less than or equal to about 1 parts by volume to about 10 parts by volume, for example, about 2 parts by volume to about 10 parts by volume, for example, about 2.5 parts by volume to about 9.2 parts by volume, for example, about 3 parts by volume to about 9 parts by volume, less than or equal to about 3.5 parts by volume to about 8 parts by volume, less than or equal to about 3.9 parts by volume to about 7.9 parts by volume, less than or equal to about 4 parts by volume to about 7.5 parts by volume, less than or equal to about 5 parts by volume to about 7.5 parts by volume, or less than or equal to about 5.5 parts by volume to about 7.5 parts by volume based on a total volume of the polymer.

As the density of most inorganic particles is known, when the inorganic particles are used by either a part by volume or a part by mass (a part by weight), a person having an ordinary skill in a related art may easily calculate the other unit from the given unit. Accordingly, even though the inorganic particles are used by either a part by volume or a part by mass, the inorganic particles may be regarded to be included in a substantially equivalent amount.

In an exemplary embodiment, the inorganic particle may be titania (TiO$_2$), for example, a titania nanorod. An aspect ratio of the titania nanorod may range from about 1 to about 50, for example, about 1.5 to about 50, about 1.5 to about 40, about 2 to about 30, about 3 to about 30, about 5 to about 30, about 5 to about 20, about 10 to about 30, about 10 to about 25, or about 10 to about 20. An average particle diameter of the shortest particle diameter of the titania nanorod may range from about 0.1 nm to about 10 nm, for example, about 1 nm to about 10 nm, about 1.5 nm to about 10 nm, about 1.5 nm to about 8 nm, or about 1.5 nm to about 5 nm, but is not limited thereto.

Advantageously, the titania nanoparticle is an inorganic particle having a high transparency. The titania nanorod may be synthesized by using titanium isopropoxide, a precursor of titania, along with a surfactant in an organic solvent, using a solvent-heating synthesis method, and the surface of the titania nanorod may be coated with the surfactant used in the synthesis, for example, a material, such as oleic acid. This titania-nanorod is relatively well dispersed in an organic solvent having a low polarity, for example, a solvent such as toluene, but is not well dispersed in a solvent having a high polarity, such as DMAc (dimethyl acetamide) or MIBK and precipitates. As a polymer, such as, for example, a polyimide or a polyamide, is dissolved in an organic polar solvent, such as, for example, DMAc, the titania nanorod should also be well dispersed in the organic polar solvent in order to form a composite with the polymer. In an embodiment, an inorganic particle wherein a surface is treated with the compound represented by Chemical Formula 1 is well dispersed in the polar solvent. A titania nanorod coated with a first surfactant, for example, oleic acid, may be coated with the compound represented by Chemical Formula 1 in a solvent. This obtained titania nanorod does not precipitate in polar solvents such as DMAc or MIBK, but forms a transparent dispersion, unlike the nanorods coated with a first surfactant such as oleic acid and the like, and, even though a polymer, such as polyimide or polyamic acid, is added thereto, may maintain a uniform dispersion, and therefore, realize a composition according to an embodiment. Without being bound by a specific theory, this phenomenon occurs because the compound represented by Chemical Formula 1 includes an ethylene oxide unit, and thus makes the surface of the titania hydrophilic. In other words, the titania includes a plurality of hydrophilic groups, such as, for example, ethylene oxide, and thus is regarded to be well dispersed in the polar solvent such as DMAc.

In an exemplary embodiment, the amic acid structural unit may be represented by Chemical Formula 2, and the imide structural unit may be represented by Chemical Formula 3:

Chemical Formula 2

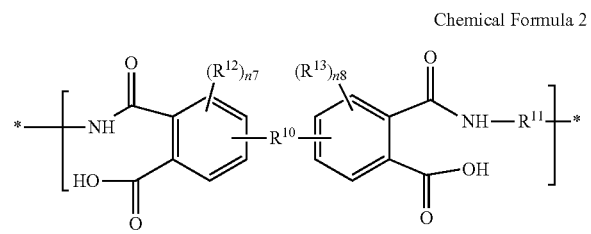

-continued

Chemical Formula 3

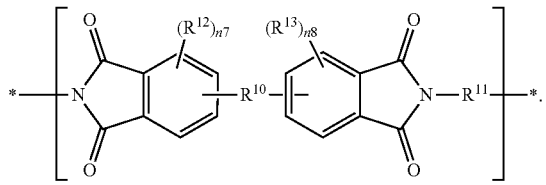

In Chemical Formula 2 and Chemical Formula 3, $R^{10}$ is a single bond, a substituted or unsubstituted C1 to C30 aliphatic organic group, a substituted or unsubstituted C3 to C30 alicyclic organic group, a substituted or unsubstituted C6 to C30 aromatic organic group, a substituted or unsubstituted C2 to C30 hetero cyclic group, or a combination thereof, $R^{11}$ is a substituted or unsubstituted C4 to C20 aliphatic cyclic group, or a substituted or unsubstituted C6 to C30 aromatic organic group, wherein the substituted or unsubstituted aromatic organic group is a single ring; a fused ring including two or more aromatic rings; or as a ring system including two or more substituted or unsubstituted single or fused aromatic rings linked by a single bond, a fluorenylene group, a substituted or unsubstituted C3 to C10 cycloalkylene group, a substituted or unsubstituted C6 to C15 arylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, —C(=O)NH—, or a combination thereof, $R^{12}$ and $R^{13}$ are independently a halogen, a hydroxy group, a substituted or unsubstituted C1 to C10 aliphatic organic group, a substituted or unsubstituted C6 to C20 aromatic organic group, a —OR$^{201}$ group (wherein, R$^{201}$ is a C1 to C10 aliphatic organic group), a —SiR$^{210}$R$^{211}$R$^{212}$ (wherein R$^{210}$, R$^{211}$ and R$^{212}$ are independently hydrogen or a C1 to C10 aliphatic organic group) group, and n7 and n8 are independently an integer of 0 to 3.

The Chemical Formula 2 may be a structural unit of polyamic acid and the Chemical Formula 3 may be a structural unit of polyimide, and thus Chemical Formula 2 may be a structural unit of a precursor of Chemical Formula 3.

The composition according to an embodiment may include either one of polyamic acid including a structural unit represented by Chemical Formula 2, or polyimide including a structural unit represented by Chemical Formula 3, as a polymer, or a poly(amic acid-imide) including both of the polyamic acid structural unit represented by Chemical Formula 2 and the polyimide structural unit represented by Chemical Formula 3 in a polymer main chain.

In general, poly(amic acid) is prepared by reacting a tetracarboxylic acid dianhydride and a diamine to polymerize, and then, the prepared poly(amic acid) is treated with heat or a chemical imidizing agent, if necessary, to imidize a part or a whole of the amic acid structural units to form a poly(amic acid-imide) or polyimide. The composition according to an embodiment includes an inorganic particle, wherein a surface of the inorganic particle is treated with the compound represented by Chemical Formula 1, along with a polyamic acid, a poly(amic acid-imide), polyimide, or a combination thereof.

In an exemplary embodiment, the composition may further include a solvent used for preparation of a polyamic acid, a poly(amic acid-imide), or a polyimide. The solvent may be an aprotic polar organic solvent, for example, a sulfoxide-based solvent such as dimethylsulfoxide, diethylsulfoxide, and the like, a formamide-based solvent such as N,N-dimethyl formamide, N,N-diethylformamide, and the like, an acetamide-based solvent such as N,N-dimethylacetamide, N,N-diethylacetamide, and the like, a pyrrolidone-based solvent such as N-methyl-2-pyrrolidone, N-vinyl-2-pyrrolidone, and the like, a phenol-based solvent such as phenol, o-, m- or p-cresol, xylenol, halogenated phenol, catechol, and the like, or hexamethylphosphoramide, γ-butyrolactone, and the like. These may be used alone or as a mixture. However, this is not limited thereto, and an aromatic hydrocarbon, such as, for example, xylene, toluene, or the like, may be used. In addition, in order to promote dissolution of the polymer, an alkali metal salt or alkaline earth metal salt may be further added to the solvent in an amount of less than or equal to about 50 wt % based on a total amount of the solvent. The solvent may be DMAc and/or MIBK, but is not limited thereto.

In Chemical Formula 2 or Chemical Formula 3, $R^{10}$ may be a single bond, or a substituted or unsubstituted C1 to C30 aliphatic organic group, $R^{11}$ may be a substituted or unsubstituted C6 to C30 aromatic organic group, wherein the substituted or unsubstituted C6 to C30 aromatic organic group includes two or more substituted or unsubstituted aromatic rings that are linked by a single bond, a fluorenylene group, a substituted or unsubstituted C3 to C10 cycloalkylene group, a substituted or unsubstituted C6 to C15 arylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, —C(=O)NH—, or a combination thereof, wherein $R^{12}$ and $R^{13}$ are independently a halogen, a hydroxy group, a substituted or unsubstituted C1 to C10 alkyl group, or a substituted or unsubstituted C6 to C20 aromatic organic group, and n7 and n8 are independently 0 or 1.

In an exemplary embodiment, $R^{10}$ of Chemical Formula 2 or Chemical Formula 3 may be a single bond, or a C1 to C10 alkylene group substituted with a haloalkyl group, $R^{11}$ may be a substituted two phenylene groups linked by a single bond, a fluorenylene group, a substituted or unsubstituted phenylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, —C(=O)NH—, or a combination thereof, and $R^{12}$ and $R^{13}$ may independently be a halogen, a hydroxy group, a substituted or unsubstituted C1 to C5 alkyl group, or a substituted or unsubstituted phenyl group, and n7 and n8 may independently be 0 or 1.

In an exemplary embodiment, $R^{10}$ of Chemical Formula 2 or Chemical Formula 3 may be a single bond, or a haloalkyl group, for example, a methylene group substituted with a —CF$_3$ group, $R^{11}$ may be a biphenyl group, wherein each phenyl group of the biphenyl group is substituted with a —CF$_3$ group, and n7 and n8 may be 0.

In an exemplary embodiment, Chemical Formula 2 may be represented by Chemical Formula 2-1, Chemical Formula 2-2, or a combination thereof, and Chemical Formula 3 may be represented by Chemical Formula 3-1, Chemical Formula 3-2, or a combination thereof:

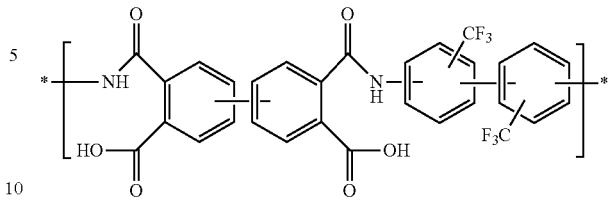

Chemical Formula 2-1

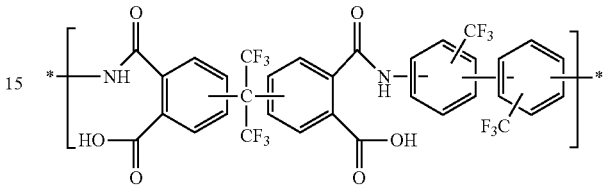

Chemical Formula 2-2

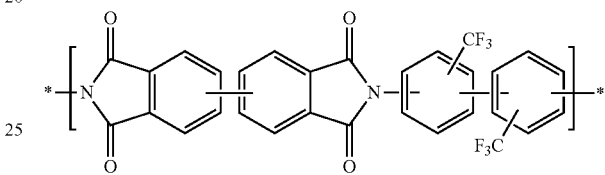

Chemical Formula 3-1

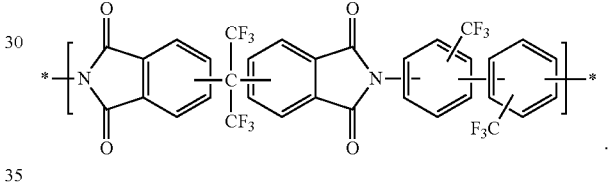

Chemical Formula 3-2

The polyamic acid, polyimide, or poly(amic acid-imide) including at least one of Chemical Formula 2-1 to Chemical Formula 3-2 may have excellent optical properties and high heat resistance and improved mechanical properties.

The polyamic acid, polyimide, or poly(amic acid-imide) according to an exemplary embodiment may be prepared by reacting a tetracarboxylic acid dianhydride with a diamine in an aprotic polar organic solvent using a polyimide preparation method known to a person of ordinary skill in the art. The aprotic polar organic solvent is the same as previously described.

The tetracarboxylic dianhydride used for preparation of the polyamic acid, polyimide, or poly(amic acid-imide) may be 2,2-bis-(3,4-dicarboxylphenyl)hexafluoropropane dianhydride (6FDA), 3,3',4,4'-biphenyltetracarboxylic dianhydride (BPDA), benzophenone tetracarboxylic dianhydride (BTDA), bis(3,4-dicarboxylphenyl)sulfone dianhydride, or a combination thereof, but is not limited thereto.

The diamine used for preparation of the polyamic acid, polyimide, or poly(amic acid-imide) may be, for example, 2,2'-bis(trifluoromethyl)benzidine (TFDB), 4,4'-diaminodiphenyl sulfone (DADPS), 4,4'-(9-fluorenylidene)dianiline (BAPF), bis(4-(4-aminophenoxy)phenyl) sulfone (BAPS), 2,2',5,5'-tetrachlorobenzidine, 2,7-diaminofluorene, 1,1-bis (4-aminophenyl)cyclohexane, 4,4'-methylene bis-(2-methylcyclohexylamine), 4,4-diaminooctafluorobiphenyl, 3,3'-dihydroxybenzidine, 1,3-cyclohexanediamine, or a combination thereof, but is not limited thereto.

The types and amounts of the tetracarboxylic dianhydride and the diamine may be appropriately selected according to desirable compositions of the polyamic acid, polyimide, or poly(amic acid-imide).

In an exemplary embodiment, the polymer may further include an amide structural unit represented by Chemical Formula 4:

Chemical Formula 4

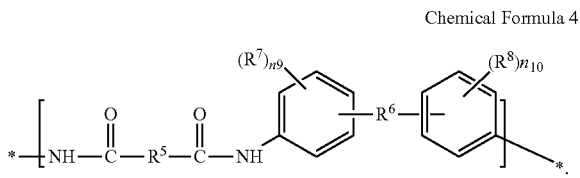

In Chemical Formula 4, $R^5$ is a substituted or unsubstituted C6 to C30 aromatic organic group, $R^6$ is a single bond, a fluorenylene group, a substituted or unsubstituted C3 to C10 cycloalkylene group, a substituted or unsubstituted C6 to C15 arylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, —C(=O)NH—, or a combination thereof, $R^7$ and $R^8$ are independently a halogen, a hydroxy group, a substituted or unsubstituted C1 to C10 aliphatic organic group, C6 to C20 aromatic organic group, —OR$^{200}$ (wherein R$^{200}$ is a C1 to C10 aliphatic organic group), or a silyl group (—SiR$^{201}$R$^{202}$R$^{203}$, wherein R$^{201}$, R$^{202}$, and R$^{203}$ are independently hydrogen, or a C1 to C10 aliphatic organic group), and n9 and n10 are independently an integer of 0 to 4.

When the polymer further includes the amide structural unit represented by Chemical Formula 4, the polymer may form poly(imide-amide). When the polymer further includes the amide structural unit represented by Chemical Formula 4, mechanical properties may be further improved.

The amide structural unit represented by Chemical Formula 4 may be prepared in a polyamide preparation method which is known in a related art, and for example, when a low temperature solution polymerization method is used, the amide structural unit represented by Chemical Formula 4 may be prepared by polymerizing carboxylic acid dichloride and diamine in an aprotic polar solvent. Herein, the diamine used to form the amide structural unit may be the same as used to form the imide structural unit or amic acid structural unit, and the carboxylic acid dichloride may be an aromatic carboxylic acid dichloride, for example, TPCl (terephthalic acid dichloride), BPCl (biphenylene dicarboxylic acid dichloride), and the like but is not limited thereto. In an exemplary embodiment, TFDB may be used as the diamine for forming the amide structural unit, and TPCl and/or BPCl may be used as the carboxylic acid dichloride.

The composition according to an embodiment may be coated on a substrate and the like, and then, cured after evaporating a solvent therefrom, and thus is manufactured into an article, such as, a film, and the like. The article includes the inorganic particles, and thus may have remarkably improved mechanical properties, as well as maintain excellent optical properties of a film formed from a polyimide or poly(imide-amide) copolymer including no inorganic particles.

For example, as shown in Example 3 that will be described later, a film formed from a composition including a polyimide and 15 parts by weight of titania nanorod, wherein a surface of the titania nanorod is treated with the compound represented by Chemical Formula 1, based on 100 parts by weight of the polyimide, shows an average transmittance of 89.8% at a total wavelength range, a yellowness index (YI) of 1.0, a haze of 0.1%, a Martens hardness of 94.2 Newton per millimeter squared (N/mm$^2$), and a modulus of 4.1 gigaPascal (GPa), and thus has excellent optical properties and remarkably improved mechanical properties, compared with a film having the same polymer as above, but not including the surface-treated inorganic particles. Herein, "Martens hardness" is one criterion for evaluating mechanical properties of a material by measuring a maximum depth depression from the surface of the material when a pyramid-shaped penetrator is applied to the surface of the material under a particular load for a particular time. In other words, the Martens hardness may be used to evaluate surface hardness of the material.

A film formed from a composition including titania in the same amount as above but not surface-treated with the compound represented by Chemical Formula 1, according to Comparative Example 1, shows a deteriorated transmittance of 79.3%, an increased yellowness index of 9.1, and increased haze of 85.5%, and thus, the optical properties are undesirable for use as an optical film. In addition, the film shows a Martens hardness of 45.0 N/mm$^2$, and a modulus of 3.3 GPa, and thus the mechanical properties are worsened, compared to a the film not including inorganic particles at all and the film according to Example 3.

When a polymer-inorganic particle nanocomposite is formed by including nonsurface-treated inorganic particles in a predetermined amount, both optical properties and mechanical properties may be deteriorated, and particularly, since the optical properties are sharply deteriorated, a film formed therefrom may not be suitable as an optical film.

When an amount of the inorganic particles surface-treated with the compound represented by Chemical Formula 1 is increased, for example, to an amount of about 25 parts by weight, about 30 parts by weight, or about 35 parts by weight based on 100 parts by weight of a polymer, then transmittance, YI, and haze may be slightly improved, but mechanical properties may be improved in proportion to the amount of the inorganic particles. Accordingly, the composition according to an embodiment and a polymer-inorganic particle nanocomposite prepared therefrom may have remarkably improved mechanical properties without deteriorating the optical properties.

Therefore, the polymer-inorganic particle nanocomposite according to an embodiment or an article formed therefrom, such as, a film, and the like, may be suitable as a window film and the like requiring excellent optical and mechanical properties, and in addition, may be applicable to various optical devices.

Hereinafter, the embodiments are described with reference to examples. The following examples are exemplary but do not limit the scope of the present disclosure.

EXAMPLES

Synthesis Example 1: Synthesis of Titania Nanorod

Figure 5:
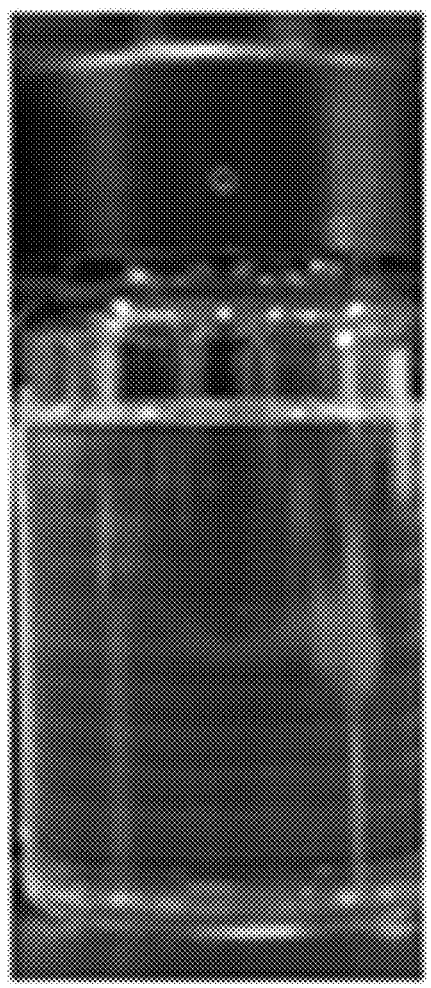
FIG. 5 is a photograph showing a dispersion including titania nanorods, wherein the nanorod surfaces are treated with oleic acid as an intermediate before synthesizing the titania nanorods, wherein the nanorod surfaces are treated with a silane compound represented by Chemical Formula 5 in Synthesis Example 1.
Figure 6:
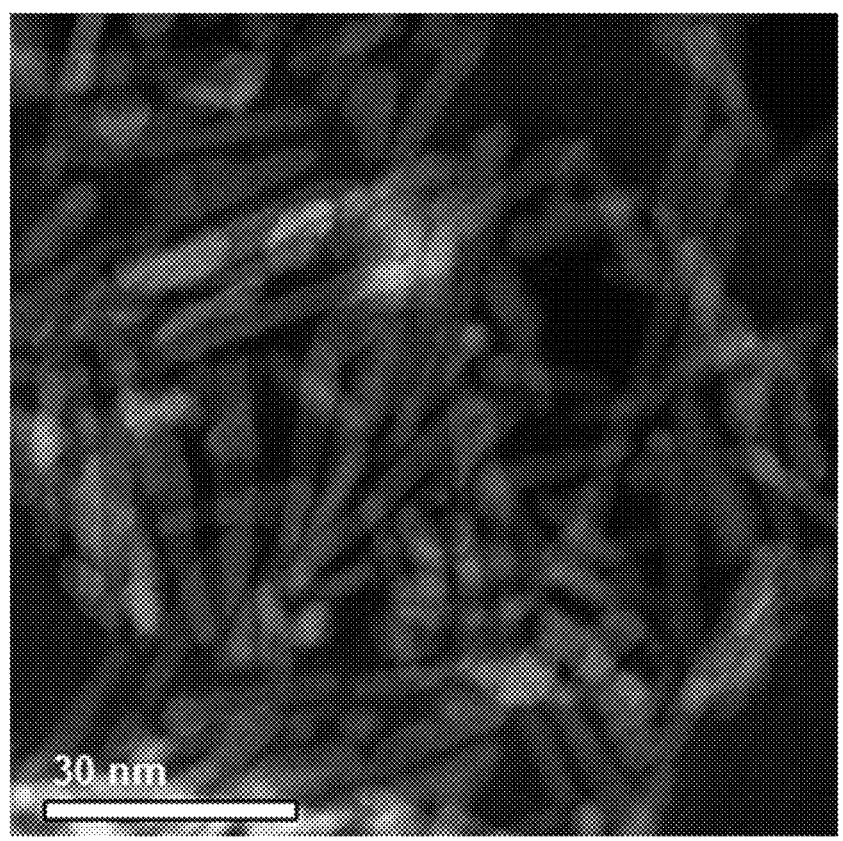
FIG. 6 is a TEM photograph showing the titania nanorods, wherein the nanorod surfaces are treated with oleic acid shown in FIG. 5.

Titanium isopropoxide is added to a concentration of 0.25 M in 50 milliliters (ml) of isopropyl alcohol including oleic acid (2M), and the mixture is stirred for 2 hours. Subsequently, the solution is heated at 180° C. for 4 hours using a microwave (MAR6, CEM Corp.) to obtain a TiO$_2$ nanorod capped with oleic acid. The obtained TiO$_2$ nanorod solution is separated from the mixture using a centrifuge at 5000 rpm for 30 minutes (SORVALL X1R, Thermo Fisher Scientific Inc.), and a bottom solution layer therefrom is washed with toluene to obtain transparent oleic acid-capped TiO$_2$ nanorod uniformly dispersed in toluene. It is confirmed that the obtained $TiO_2$ is relatively uniformly dispersed in the toluene solution upon visual inspection by the naked eye (FIG. 5) and a TEM photograph (FIG. 6).

In order to treat the oleic acid-capped $TiO_2$ nanorod with a silane compound represented by Chemical Formula 5 (Gelest Inc.), the silane compound represented by Chemical Formula 5 is added thereto (in a ratio of 1:1 based on a weight of $TiO_2$), and the mixture is reacted at room temperature for 48 hours. During the reaction, the silane compound represented by Chemical Formula 5 displaces the oleic acid capped on the surface, and the resultant silane-coated particles are filtered and dispersed in an acetone solvent to obtain $TiO_2$ nanorod treated with the silane compound represented by Chemical Formula 5:

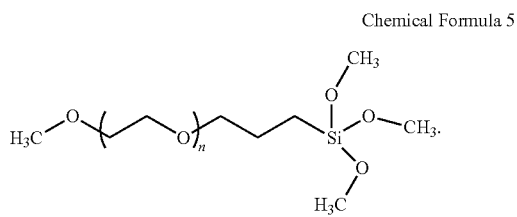

Chemical Formula 5

In Chemical Formula 5, n is 9 to 12.

Figure 7:
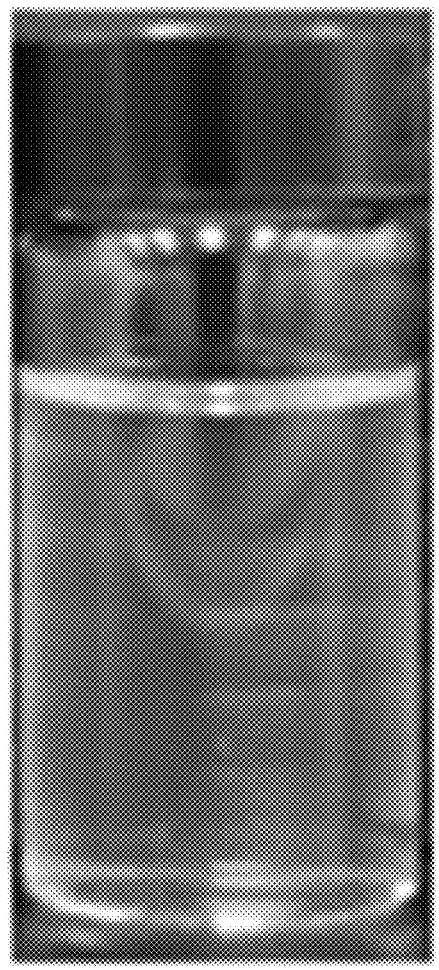
FIG. 7 is a photograph showing a dispersion prepared by dispersing titania nanorods, wherein the nanorod surfaces are treated with a silane compound represented by Chemical Formula 5, according to Synthesis Example 1, in an MIBK solvent.
Figure 8:
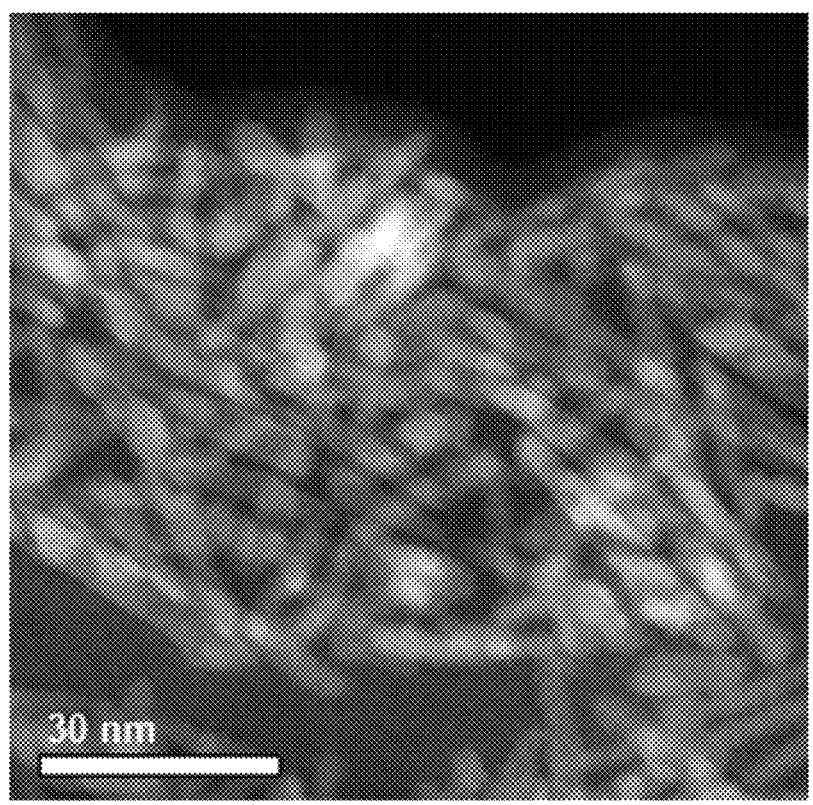
FIG. 8 is a TEM photograph showing the titania nanorods, wherein the nanorod surfaces are treated with the silane compound represented by Chemical Formula 5, according to Synthesis Example 1.

A solution in which $TiO_2$ treated with the compound represented by Chemical Formula 5 is dispersed in MIBK also appears transparent (FIG. 7), and a TEM photograph thereof (FIG. 8) shows that the titania nanorod treated with the compound of Chemical Formula 5 is uniformly dispersed.

Synthesis Example 2: Preparation of Polyimide Solution 4.8034 g (0.015 mol) of TFDB is dissolved in 40 ml of DMAc at 25° C. under a nitrogen atmosphere in a 250 ml double wall reactor equipped with a mechanical agitator and a nitrogen inlet. Subsequently, 5.3309 g (0.012 mol) of 6FDA, 0.8827 g (0.003 mol) of BPDA, and 14 ml of DMAc are added to the solution and reacted therewith at 25° C. for 24 hours to obtain a polyamic acid solution (a solid content of 18 wt %). Then, 4.3 ml (0.045 mol) of acetic anhydride and 3.6 ml (0.045 mol) of pyridine are slowly added to the polyamic acid solution, and the mixture is stirred at 25° C. for 15 hours to complete a chemical imidization. The obtained polyimide is precipitated in distilled water, ground with a blender, and washed with ethanol. A white precipitate therefrom is filtered and vacuum-dried overnight at 70° C. The obtained polyimide is dissolved in MIBK to prepare an 18 wt % solution.

Examples 1 to 6: Preparation of Polyimide-Inorganic Particle Nanocomposite Solution The surface-treated titania nanorod of Synthesis Example 1 is added to the polyimide solution of Synthesis Example 2 and mixed therewith to prepare a polyimide-inorganic particle nanocomposite solution. Specifically, each polymer-inorganic particle nanocomposite solution according to Examples 1 to 6 is prepared by respectively adding 5 parts by weight (Example 1), 10 parts by weight (Example 2), 15 parts by weight (Example 3), 25 parts by weight (Example 4), 30 parts by weight (Example 5) and 35 parts by weight (Example 6) of the surface-treated titania nanorod according to Synthesis Example 1 to the polyimide solution according to Synthesis Example 2 based on 100 parts by weight of a polyimide (solid content), and then, stirring each mixture including the polyimide and the surface-treated titania nanorod at room temperature for 2 hours. The polyimide-inorganic particle nanocomposite solution is visually all transparent.

Comparative Example 1: Preparation of Polyimide-Inorganic Particle Nanocomposite Solution A polyimide-inorganic particle nanocomposite solution according to Comparative Example 1 is prepared by adding 15 parts by weight of nonsurface-treated titania particles to the polyimide solution of Synthesis Example 2 based on 100 parts by weight of the polyimide (solid content). The solution according to Comparative Example 1 is stirred for the same time as Examples 1 to 6, but the resultant solution is not transparent but opaque.

Film Manufacture and Evaluation

The polyimide-inorganic particle nanocomposite solutions according to Examples 1 to 6 and the polyimide-inorganic particle nanocomposite solution according to Comparative Example 1 are respectively coated on a glass substrate, and a solvent is removed therefrom to obtain each film. Specifically, the nanocomposite solutions according to Examples 1 to 6 and Comparative Example 1 are respectively dropped on a glass substrate (5×5 cm) and spin-coated at a rotation speed of 600 to 3,000 rpm. The spin-coated samples are respectively pre-dried at 80° C. on a hot plate for 30 minutes to evaporate an excessive amount of the solvent. Subsequently, the samples are heated up to 200° C. under a nitrogen atmosphere at a heating rate of 10° C./min, and then, maintained and dried for 1 hour to obtain each film according to the Examples and Comparative Example. In addition, a film of a control group is prepared by not including inorganic particles at all but including only the polyimide solution of Synthesis Example 2.

Optical properties of each film, that is, an average transmittance (%) at total wavelength range, a yellowness index (YI), and haze (%) of the film are measured, in addition, mechanical characteristics of the film, that is, Martens hardness, a tensile modulus, and flexural characteristics (toughness) of the film are measured in the following method, and the results are shown in Table 1.

The optical properties (transmittance, yellowness index, and haze) of the film are measured by using a spectrophotometer, "Konica Minolta CM3600d," in a transmittance opacity/haze mode. An average transmittance at total wavelength range is measured in a wavelength range of 360 nm to 700 nm.

The tensile modulus is measured according to ASTM D882.

The Martens hardness is measured by using FISCHER-SCOPE HM2000 LT made by Helmut Fisher Co., Ltd.

The flexural characteristics (toughness) are obtained by measuring a strain (X-axis) and a stress (Y-axis) according to ASTM D882 and calculating a total area thereof.

TABLE 1

| | Addition amount of TiO$_2$ parts by weight (parts by volume) | Optical properties | | | Mechanical characteristics | | |
|---|---|---|---|---|---|---|---|
| | | Tr@ total (%) | YI D1 925 | Haze (%) | Hardness ($H_{M_r}$ N/mm$^2$) | Modulus (GPa) | Toughness [Joule · m$^{-3}$ · 10$^4$] |
| Control group | 0 | 90.8 | 0.7 | 0.1 | 48.1 | 3.6 | 279.3 |
| Example 1 | 51.3 | 90.6 | 1.0 | 0.1 | 49.4 | — | — |
| Example 2 | 102.6 | 89.9 | 1.0 | 0.1 | 52.2 | 3.6 | 289.1 |
| Example 3 | 153.9 | 89.8 | 1.0 | 0.1 | 94.2 | 4.1 | — |
| Example 4 | 256.6 | 90.0 | 1.0 | 0.1 | 103.6 | 4.3 | 471.7 |
| Example 5 | 307.9 | 89.7 | 1.2 | 0.1 | 100.4 | 4.3 | 547.8 |
| Example 6 | 359.2 | 89.1 | 1.3 | 0.1 | 87.9 | 4.3 | — |
| Comparative Example 1 | 153.9 | 79.3 | 9.1 | 85.5 | 45.0 | 3.3 | 273.7 |

As shown in Table 1, each film respectively formed of the compositions of Examples 1 to 6 including 5 parts by weight to 35 parts by weight of the surface-treated titania nanorod according to Synthesis Example 1 based on 100 parts by weight of a polyimide (solid content) show similar optical properties to the control group. In other words, optical properties of a film do not deteriorate as the amount of inorganic particles is increased.

Advantageously, the films according to Examples 1 to 6 all show remarkably increased Martens hardness, modulus, and flexural characteristics compared with the control. In other words, the films formed from a polymer-inorganic particle nanocomposites show remarkably improved mechanical properties, such as surface hardness, a tensile modulus, flexural characteristics, and the like, without deteriorating optical properties.

The film according to Comparative Example 1 shows sharply deteriorated optical properties compared with the film according to Example 3, even though the same amount of inorganic particles are included in each composition. In other words, the optical properties of the film are sharply deteriorated due to the aggregation of the titania particles. In addition, the film according to Comparative Example 1 does not show improvement of mechanical properties, even compared with the film including no inorganic particles according to the control. Therefore, when 15 parts by weight of surface-treated inorganic particles are included, based on 100 parts by weight of a polymer, mechanical properties may be remarkably improved without deteriorating optical properties, but when the inorganic particles within the content range are simply mixed with the polymer without a surface treatment, optical properties and mechanical properties may be deteriorated due to the formation of an aggregate.

Accordingly, a polymer-inorganic particle nanocomposite capable of remarkably improving mechanical properties without deteriorating optical properties, and an article formed therefrom may be provided according to an embodiment, and this article may be suitable for an optical device and the like requiring high transparency and excellent mechanical properties.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A composition comprising
a polymer comprising an amic acid structural unit, an imide structural unit, or a combination thereof, and
an inorganic particle, wherein a surface of the inorganic particle is treated with a compound represented by Chemical Formula 1:

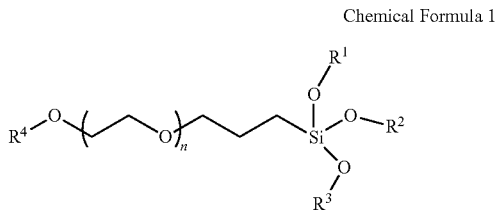

Chemical Formula 1 wherein, in Chemical Formula 1, $R^1$ to $R^4$ are independently a C1 to C30 alkyl group, a C3 to C10 cycloalkyl group, a C6 to C30 aryl group, or a combination thereof, and n is an integer of 1 or more,
wherein the amic acid structural unit is represented by Chemical Formula 2, and the imide structural unit is represented by Chemical Formula 3:

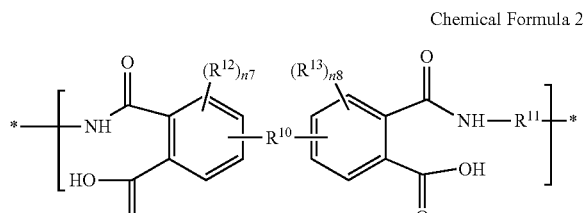

Chemical Formula 2

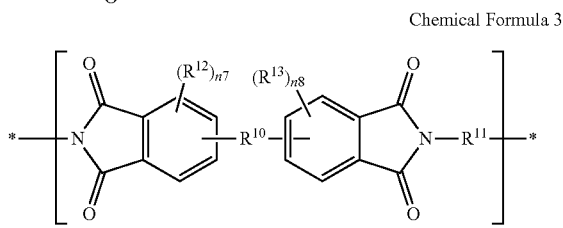

Chemical Formula 3 wherein, in Chemical Formula 2 and Chemical Formula 3,
$R^{10}$ is a single bond, a substituted or unsubstituted C1 to C30 aliphatic organic group, a substituted or unsubstituted C3 to C30 alicyclic organic group, a substituted or unsubstituted C6 to C30 aromatic organic group, a substituted or unsubstituted C2 to C30 hetero cyclic group, or a combination thereof, $R^{11}$ is a substituted or unsubstituted C4 to C20 aliphatic cyclic group, or a substituted or unsubstituted C6 to C30 aromatic organic group, wherein the substituted or unsubstituted aromatic organic group is a single ring; a fused ring including two or more aromatic rings; or a ring system comprising two or more substituted or unsubstituted single or fused aromatic rings linked by a single bond, a fluorenylene group, a substituted or unsubstituted C3 to C10 cycloalkylene substituted or unsubstituted C6 to C15 arylene group, —O—, —S—, —C(=O)—, —CH(OH)—, —S(=O)$_2$—, —Si(CH$_3$)$_2$—, —(CH$_2$)$_n$— (wherein, 1≤p≤10), —(CF$_2$)$_q$— (wherein, 1≤q≤10), —C(CH$_3$)$_2$—, —C(CF$_3$)$_2$—, —C(=O)NH—, or a combination thereof, $R^{12}$ and $R^{13}$ are independently a halogen, a hydroxy group, a substituted or unsubstituted C1 to C10 aliphatic organic group, substituted or unsubstituted C6 to C20 aromatic organic group, a —OR$^{201}$ group (wherein, R$^{201}$ is a C1 to C10 aliphatic organic group), or a —SiR$^{210}$R$^{211}$R$^{212}$ (wherein R$^{210}$, R$^{211}$, and R$^{212}$ are independently hydrogen or a C1 to C10 aliphatic organic group) group, and n7 and n8 are independently integers of 0 to 3.

2. The composition of claim 1, wherein $R^1$ to $R^4$ of Chemical Formula 1 are independently a C1 to C10 alkyl group, and n is an integer greater than or equal to 3 and less than or equal to 30.

3. The composition of claim 1, wherein each of $R^1$ to $R^4$ of Chemical Formula 1 is a methyl group, and n is an integer greater than or equal to 5 and less than or equal to 20.

4. The composition of claim 1, wherein the inorganic particle is an oxide, a hydroxide, a carboxylate, or a nitride of Ti, Si, Al, Zr, Zn, Sn, B, Ce, Sr, Ca, Ba, In, or W, a graphene oxide, or a combination thereof.

5. The composition of claim 1, wherein the inorganic particle is silica, alumina, titania, zirconia, zinc oxide, indium tin oxide, strontium carbonate, zirconium tungsten oxide, antimony-doped tin oxide, graphene oxide, or a combination thereof.

6. The composition of claim 1, wherein an aspect ratio of the inorganic particle ranges from about 1 to about 100.

7. The composition of claim 6, wherein the inorganic particle has an average particle diameter of a shortest particle diameter ranging from about 0.1 nanometers to about 200 nanometers.

8. The composition of claim 1, wherein the inorganic particle is a titania nanorod.

9. The composition of claim 8, wherein an aspect ratio of the titania nanorod is about 1.5 to about 50, an average particle diameter of the shortest particle diameter is about 0.1 nanometers to about 10 nanometers.

10. The composition of claim 1, wherein the inorganic particle comprises an amount of less than or equal to about 50 parts by weight based on 100 parts by weight of the polymer.

11. The composition of claim 1, wherein the composition further comprises a solvent.

12. The composition of claim 1, wherein in Chemical Formula 2 or Chemical Formula 3, $R^{10}$ is a single bond, or a substituted or unsubstituted C1 to C30 aliphatic organic group, $R^{11}$ is a substituted or unsubstituted C6 to C30 aromatic organic group, wherein the substituted or unsubstituted C6 to C30 aromatic organic group is a ring system comprising two or more single or fused aromatic rings linked by a single bond, a fluorenylene group, a substituted or unsubstituted C3 to C10 cycloalkylene group, a substituted or unsubstituted C6 to C15 arylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, —C(=O)NH—, or a combination thereof, $R^{12}$ and $R^{13}$ are independently a halogen, a hydroxy group, a substituted or unsubstituted C1 to C10 alkyl group, or a substituted or unsubstituted C6 to C20 aromatic organic group, and n7 and n8 are independently 0 or 1.

13. The composition of claim 12, wherein in Chemical Formula 2 or Chemical Formula 3, $R^{10}$ is a single bond, or a C1 to C10 alkylene group substituted with a haloalkyl group, $R^{11}$ is a substituted two phenylene groups linked by a single bond, a fluorenylene group, a substituted or unsubstituted phenylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, —C(=O)NH—, or a combination thereof, $R^{12}$ and $R^{13}$ are independently a halogen, a hydroxy group, a substituted or unsubstituted C1 to C5 alkyl group, or a substituted or unsubstituted phenyl group, and n7 and n8 are independently 0 or 1.

14. The composition of claim 1, wherein Chemical Formula 2 is represented by Chemical Formula 2-1, Chemical Formula 2-2, or a combination thereof, and Chemical Formula 3 is represented by Chemical Formula 3-1, Chemical Formula 3-2, or a combination thereof:

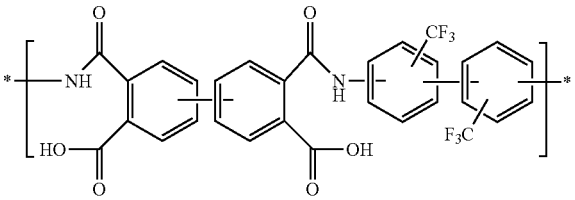

Chemical Formula 2-1

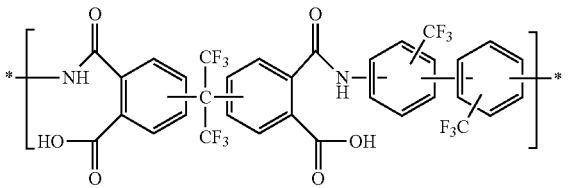

Chemical Formula 2-2

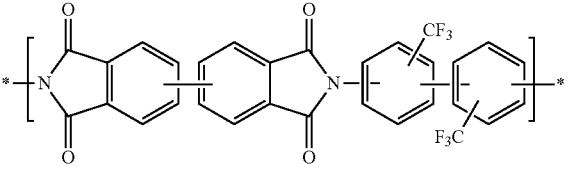

Chemical Formula 3-1

Chemical Formula 3-2

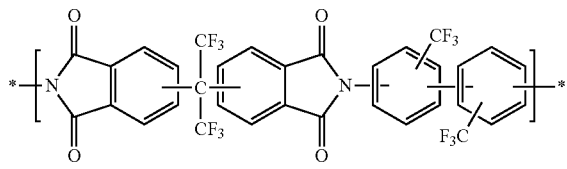

15. The composition of claim 1, wherein the polymer further comprises an amide structural unit represented by Chemical Formula 4:

Chemical Formula 4

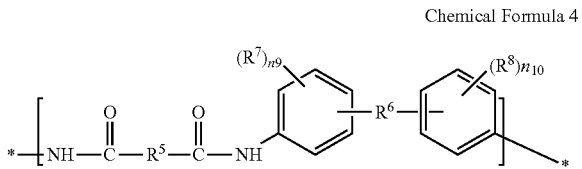

wherein, in Chemical Formula 4, $R^5$ is a substituted or unsubstituted C6 to C30 aromatic organic group, $R^6$ is a single bond, a fluorenylene group, a substituted or unsubstituted C3 to C10 cycloalkylene group, a substituted or unsubstituted C6 to C15 arylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, —C(=O)NH—, or a combination thereof, $R^7$ and $R^8$ are independently a halogen, a hydroxy group, a substituted or unsubstituted C1 to C10 aliphatic organic group, C6 to C20 aromatic organic group, —OR$^{200}$ (wherein R$^{200}$ is a C1 to C10 aliphatic organic group), or a silyl group (—SiR$^{201}$R$^{202}$R$^{203}$, wherein R$^{201}$, R$^{202}$, and R$^{203}$ are independently hydrogen, a C1 to C10 aliphatic organic group), and n9 and n10 are independently integers of 0 to 4.

16. A polyimide-inorganic particle composite manufactured from the composition of claim 1.

17. An article comprising the polyimide-inorganic particle composite of claim 16.

18. The article of claim 17, wherein the article is a film.

19. An optical device comprising the article of claim 17.

* * * * *